US008303399B2

(12) United States Patent
Fujimoto

(10) Patent No.: US 8,303,399 B2
(45) Date of Patent: Nov. 6, 2012

(54) GAMING CONTROL SYSTEM

(75) Inventor: Jun Fujimoto, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1493 days.

(21) Appl. No.: 11/372,089

(22) Filed: Mar. 10, 2006

(65) Prior Publication Data

US 2006/0211485 A1 Sep. 21, 2006

(30) Foreign Application Priority Data

Mar. 11, 2005 (JP) ................................ 2005-069404

(51) Int. Cl.
*A63F 9/24* (2006.01)
*G06F 19/00* (2006.01)

(52) U.S. Cl. .............................. 463/25; 463/29; 463/42

(58) Field of Classification Search .................... 463/25, 463/29, 42, 16; 705/4
See application file for complete search history.

(56) References Cited

U.S. PATENT DOCUMENTS 6,113,493 A 9/2000 Walker et al.
2003/0119585 A1 6/2003 Walker et al.
2003/0220138 A1 11/2003 Walker et al.
2003/0224854 A1 12/2003 Joao
2004/0152518 A1 8/2004 Kogo

FOREIGN PATENT DOCUMENTS

EP 0 497 562 A2 8/1992
JP 4-244178 9/1992
RU 2105586 2/1998

OTHER PUBLICATIONS

U.S. Appl. No. 11/363,079, filed Feb. 28, 2006, Fujimoto.
U.S. Appl. No. 11/372,088, filed Mar. 10, 2006, Fujimoto.
U.S. Appl. No. 11/372,083, filed Mar. 10, 2006, Fujimoto.

*Primary Examiner* — Peter DungBa Vo
*Assistant Examiner* — Damon Pierce
(74) *Attorney, Agent, or Firm* — Edwards Wildman Palmer LLP

(57) ABSTRACT

Concerning with the game insurance objectifying the game result in each of the gaming machines, based on the game information transmitted from each of the gaming machines (S103) and the information of the insurance contents stored in the insurance control server, the insurance control server determines whether or not the insurance money of the game insurance is paid (S407). At that time, based on the ID number of the member's card transmitted from the card unit (S203) and the member information transmitted from the member control server (S301), the insurance control server specifies the player of the member who is the object person of the game insurance (S407).

6 Claims, 10 Drawing Sheets

| | |
|---|---|
| S101 | PROGRESSING GAME WHICH IS OUT OF GAME INSURANCE |
| S102 | PROGRESSING GAME WHICH IS OBJECT OF GAME INSURANCE |
| S103 | TRANSMITTING GAME INFORMATION |
| S201 | INSERTION OF MEMBER'S CARD? |
| S202 | DISCHARGE OF MEMBER'S CARD? |
| S203 | TRANSMITTING ID NUMBER OF MEMBER'S CARD |
| S204 | DISCHARGE OF MEMBER'S CARD? |
| S301 | TRANSMITTING MEMBER INFORMATION |
| S401 | INSURANCE IS CONTRACTED? |
| S402 | REQUESTING ID NUMBER OF MEMBER'S CARD |
| S403 | RECEIVING ID NUMBER OF MEMBER'S CARD |
| S404 | REQUESTING MEMBER INFORMATION |
| S405 | RECEIVING MEMBER INFORMATION |
| S406 | PAYOUT OF PREMIUM IS CONFIRMED? |
| S407 | INSURANCE PAYOUT CONDITION IS SATISFIED? |
| S408 | RENEWING PAYOUT LIST OF INSURANCE MONEY |

| | |
|---|---|
| S1101 | PROGRESSING GAME WHICH IS OUT OF GAME INSURANCE |
| S1102 | PROGRESSING GAME WHICH IS OBJECT OF GAME INSURANCE |
| S1103 | TRANSMITTING GAME INFORMATION |
| S1201 | INSERTION OF MEMBER'S CARD? |
| S1202 | DISCHARGE OF MEMBER'S CARD? |
| S1203 | TRANSMITTING ID NUMBER OF MEMBER'S CARD |
| S1204 | DISCHARGE OF MEMBER'S CARD? |
| S1301 | TRANSMITTING MEMBER INFORMATION |
| S1401 | INSURANCE IS CONTRACTED? |
| S1402 | REQUESTING ID NUMBER OF MEMBER'S CARD |
| S1403 | RECEIVING ID NUMBER OF MEMBER'S CARD |
| S1404 | REQUESTING MEMBER INFORMATION |
| S1405 | RECEIVING MEMBER INFORMATION |
| S1406 | PAYOUT OF PREMIUM IS CONFIRMED? |
| S1407 | INSURANCE PAYOUT CONDITION IS SATISFIED? |
| S1408 | RENEWING PAYOUT LIST OF INSURANCE MONEY |

FIG. 7B

| | |
|---|---|
| S101 | PROGRESSING GAME WHICH IS OUT OF GAME INSURANCE |
| S102 | PROGRESSING GAME WHICH IS OBJECT OF GAME INSURANCE |
| S103 | TRANSMITTING GAME INFORMATION |
| S201 | INSERTION OF MEMBER'S CARD? |
| S202 | DISCHARGE OF MEMBER'S CARD? |
| S203 | TRANSMITTING ID NUMBER OF MEMBER'S CARD |
| S204 | DISCHARGE OF MEMBER'S CARD? |
| S301 | TRANSMITTING MEMBER INFORMATION |
| S401 | INSURANCE IS CONTRACTED? |
| S402 | REQUESTING ID NUMBER OF MEMBER'S CARD |
| S403 | RECEIVING ID NUMBER OF MEMBER'S CARD |
| S404 | REQUESTING MEMBER INFORMATION |
| S405 | RECEIVING MEMBER INFORMATION |
| S406 | PAYOUT OF PREMIUM IS CONFIRMED? |
| S407 | INSURANCE PAYOUT CONDITION IS SATISFIED? |
| S408 | RENEWING PAYOUT LIST OF INSURANCE MONEY |

FIG. 8B

| | |
|---|---|
| S1101 | PROGRESSING GAME WHICH IS OUT OF GAME INSURANCE |
| S1102 | PROGRESSING GAME WHICH IS OBJECT OF GAME INSURANCE |
| S1103 | TRANSMITTING GAME INFORMATION |
| S1201 | INSERTION OF MEMBER'S CARD? |
| S1202 | DISCHARGE OF MEMBER'S CARD? |
| S1203 | TRANSMITTING ID NUMBER OF MEMBER'S CARD |
| S1204 | DISCHARGE OF MEMBER'S CARD? |
| S1301 | TRANSMITTING MEMBER INFORMATION |
| S1401 | INSURANCE IS CONTRACTED? |
| S1402 | REQUESTING ID NUMBER OF MEMBER'S CARD |
| S1403 | RECEIVING ID NUMBER OF MEMBER'S CARD |
| S1404 | REQUESTING MEMBER INFORMATION |
| S1405 | RECEIVING MEMBER INFORMATION |
| S1406 | PAYOUT OF PREMIUM IS CONFIRMED? |
| S1407 | INSURANCE PAYOUT CONDITION IS SATISFIED? |
| S1408 | RENEWING PAYOUT LIST OF INSURANCE MONEY |

GAMING CONTROL SYSTEM

CROSS-REFERENCE TO THE RELATED APPLICATION(S)

This application is based upon and claims a priority from the prior Japanese Patent Application No. 2005-069404 filed on Mar. 11, 2005, the entire contents thereof are incorporated herein by reference.

BACKGROUND OF THE INVENTION

1. Field of the Invention

The present invention relates to a gaming control system in which a game insurance objectifying a game result obtained in a gaming machine is controlled by an insurance control server while utilizing a member's card.

2. Description of Related Art

Conventionally, as a gaming machine, for example, it is disclosed a slot machine to which insurance function is added. In this kind of slot machine, as shown in Unexamined Japanese Patent Publication No. 4-244178, based on that insurance coins are inserted before a game is started, if coins for starting the game are consumed to some extent, insurance coins are paid out by a ruled number even if a winning combination is not obtained, thereby loss of a player is reduced.

However, the insurance function through the insurance coins is limited to contents, such as payout of insurance coins with a ruled number corresponding to a number of consumed coins for starting the game as mentioned in the above, preset in the slot machine in which the insurance coins are inserted. Therefore, only uniform insurance services can be provided and there is an obstacle to provide variegated services corresponding to requests by the players.

SUMMARY OF THE INVENTION

In order to dissolve the above problems, the present invention has been done and has an object to provide a gaming control system in which variegated services can be developed corresponding to requests of players, concerning with a game insurance objectifying a game result in a gaming machine.

In order to accomplish the above object, according to one aspect of the present invention, it is provided a gaming control system having a gaming machine, a member control server and an insurance control server, the gaming machine, the member control server and the insurance control server being connected through a network, wherein the gaming machine comprising:

a card unit arranged in the gaming machine, the card unit reading an ID number of a member's card;

a permission device for permitting a game in the gaming machine under a condition that the member's card is detected through the card unit; and a formation device for forming game information concerning with a game result in the gaming machine;

wherein the member control server comprising:

a member memory device for storing member information corresponding to the ID number read by the card unit of the gaming machine; and wherein the insurance control server comprising:

an insurance memory device for storing insurance information corresponding to an object person of a game insurance;

a specification device for specifying the object person of the game insurance based on the member information stored in the member memory device of the member control server and the ID number read by the card unit of the gaming machine; and a first determination device for determining whether or not insurance of the game insurance is paid for the object person of the game insurance specified by the specification device based on the game information transmitted from the formation device of the gaming machine and the insurance information stored in the insurance memory device.

Here, in the above gaming control system, "game insurance" means a system that a plurality of players pay premiums for provision of loss in the games and a predetermined worthy thing (for example, money or game media) is paid for the player who loses in the game, by utilizing the premiums as a fund.

That is to say, in the gaming control system according to the present invention, concerning with the game insurance objectifying the game result in the gaming machine, it is determined by the insurance control server whether or not the insurance of the game insurance is paid, based on the game information from the gaming machine and the insurance information of the insurance control server, thereby variegated services can be developed corresponding to the request of the player by utilizing the insurance information of the insurance control server.

Further, in the gaming control system according to the present invention, based on the ID number read by the card unit of the gaming machine and the member information of the member control server, the object person of the game insurance is specified by the insurance control server, thereby variegated services can be developed corresponding to the request of the player by utilizing the member information of the member control server.

The above and further objects and novel features of the invention will more fully appear from the following detailed description when the same is read in connection with the accompanying drawings. It is to be expressly understood, however, that the drawings are for purpose of illustration only and not intended as a definition of the limits of the invention.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention.

In the drawings.

DETAILED DESCRIPTION OF THE PREFERRED EMBODIMENTS

Figure 1:
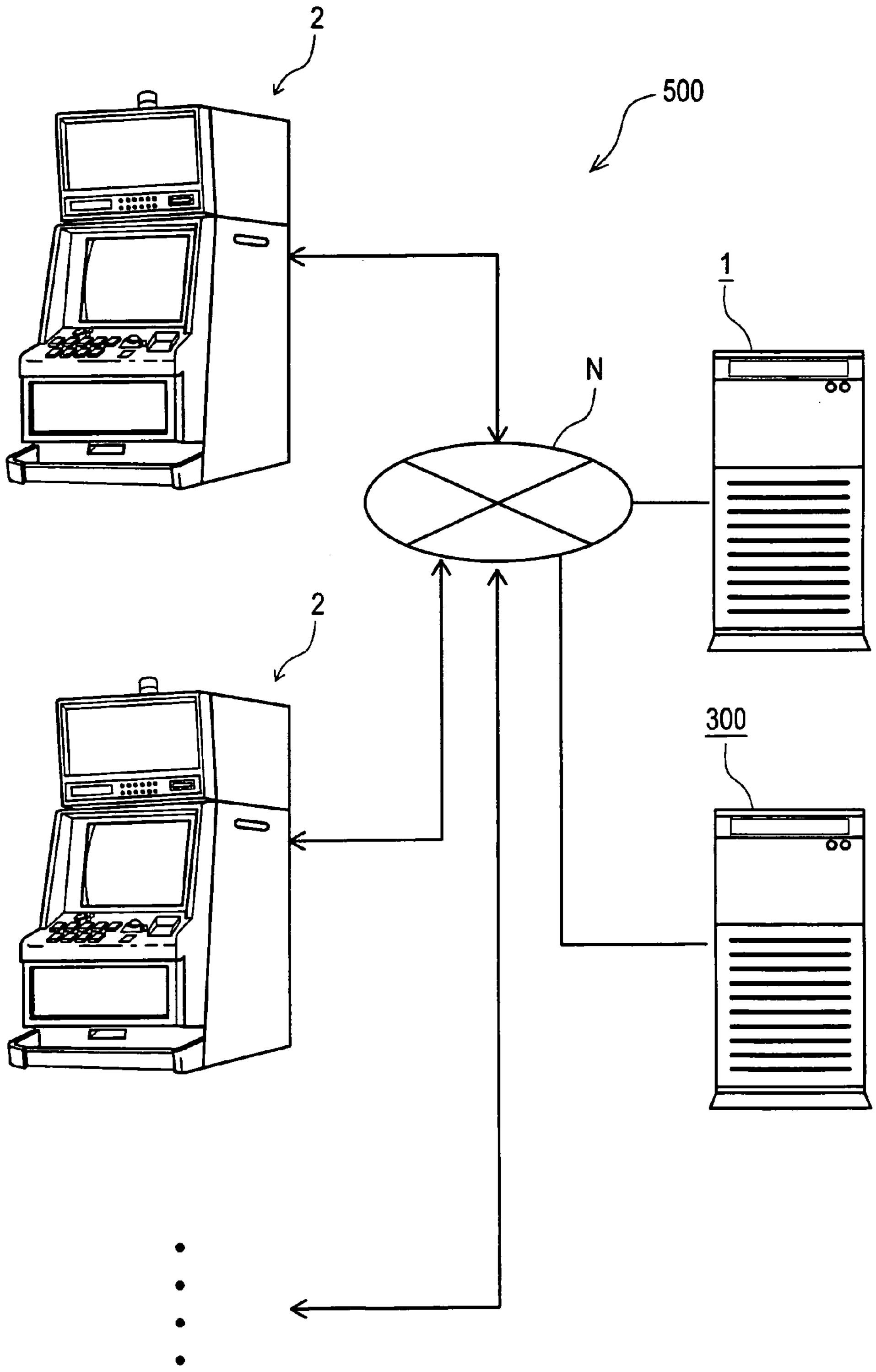
FIG. 1 is an explanatory view showing an outline construction of a gaming control system in which an insurance control server, a member control server and gaming machines are mutually connected through a network, in the embodiment.

Hereinafter, a preferred embodiment of the present invention will be described with reference to the drawings. First, an outline construction of gaming control system according to the embodiment will be described. The gaming control system of the embodiment is a system in which a plurality of gaming machines to each of which a card unit is provided, a member control server and an insurance control server are mutually connected through a network.

Here, in each of the card units, an ID number stored in a member's card is read out and each ID number is corresponded to each member one to one, therefore a player playing in the gaming machine to which the card unit is provided can be specified through the ID number of the member's card.

And in the member control server, member information (for example, name, address, birth day, biometrics information, account number of transaction bank and the like) is stored corresponding to the ID number, thereby such member information is controlled every member who is the player.

Further, in the insurance control server, a game insurance of the member as the player is controlled. Here, the game insurance means a system that loss in the game conducted in each of the gaming machines is compensated for the member who is the player by insurance money on a condition that a premium is paid. And there are many cases that insurance contents are mutually different according to contents of insurance contract including special contract such as automatic renewal concluded by the member who is the player. Thus, in the insurance control server, the insurance contents, including whether or not the insurance money is paid, of the member who is the player are stored corresponding to the ID number, thereby such insurance contents are controlled every the member who is the player.

Further, in the insurance control server, a series of processes from insurance acceptance to payout of insurance money are automated. At that time, in order to confirm the insurance contents of the game insurance realized every member who is the player, the account number of transaction bank from which the premium is pulled down and to which the insurance money is paid, the game result of the gaming machine which is the object of the insurance, the insurance server obtains the ID number from each of the card units, the member information from the member control server and the game result from the gaming machine on the basis of the ID number obtained as mentioned.

Here, in the embodiment, as one example of the gaming machine, although it is shown the gaming machine in which a game is played while game contents are displayed on an image display device, the gaming machine is not limited to such gaming machine. For example, a slot machine provided with a plurality of reels actually rotating or a Japanese pachinko gaming machine may be utilizable.

And in the embodiment, although "coins" are used as game media utilized in the gaming machine, coins circulated in a country where the gaming machine is used, medals or tokens which are individually used in a game arcade where the gaming machine is used and are obtainable by the player based on that actual coins in the country where the gaming machine is used are exchanged thereto, are included in the "coins".

And as the game media, in addition to coins, pachinko balls may be used in the Japanese pachinko gaming machine, and in the gaming machine in which a card such a magnetic card or an IC card storing data obtained by conducting the numeral process of the game media such as coins is used, such data may be utilized instead of the coins.

[Construction of the Gaming Control System]

It will be described in FIG. 1 one example of the gaming control system in which the insurance control server and the member control server are connected to plural gaming machines as communication terminals through the network.

As shown in FIG. 1, in a gaming control system 500, an insurance control server 1 and a member control server 300 are connected to plural gaming machines 2 through a network N as a communication circuit. Through the network N, the gaming control system 500 is constructed so that the insurance control server 1, the member control server 300 and the gaming machines 2 can mutually transmit and receive various kinds of information.

Here, although the insurance control server 1 and the member control server 300 transmit and receive various data with plural gaming machines 2, a peculiar discriminative number is respectively attached to each of the gaming machines 2, and the insurance control server 1 and the member control server 300 discriminate each of the gaming machines 2 from which the data are transmitted and discriminates each of the gaming machines 2 to which the data are to be transmitted among the gaming machines 2, on the basis of the above discriminative number.

[Construction of the Insurance Control Server]

Figure 2:
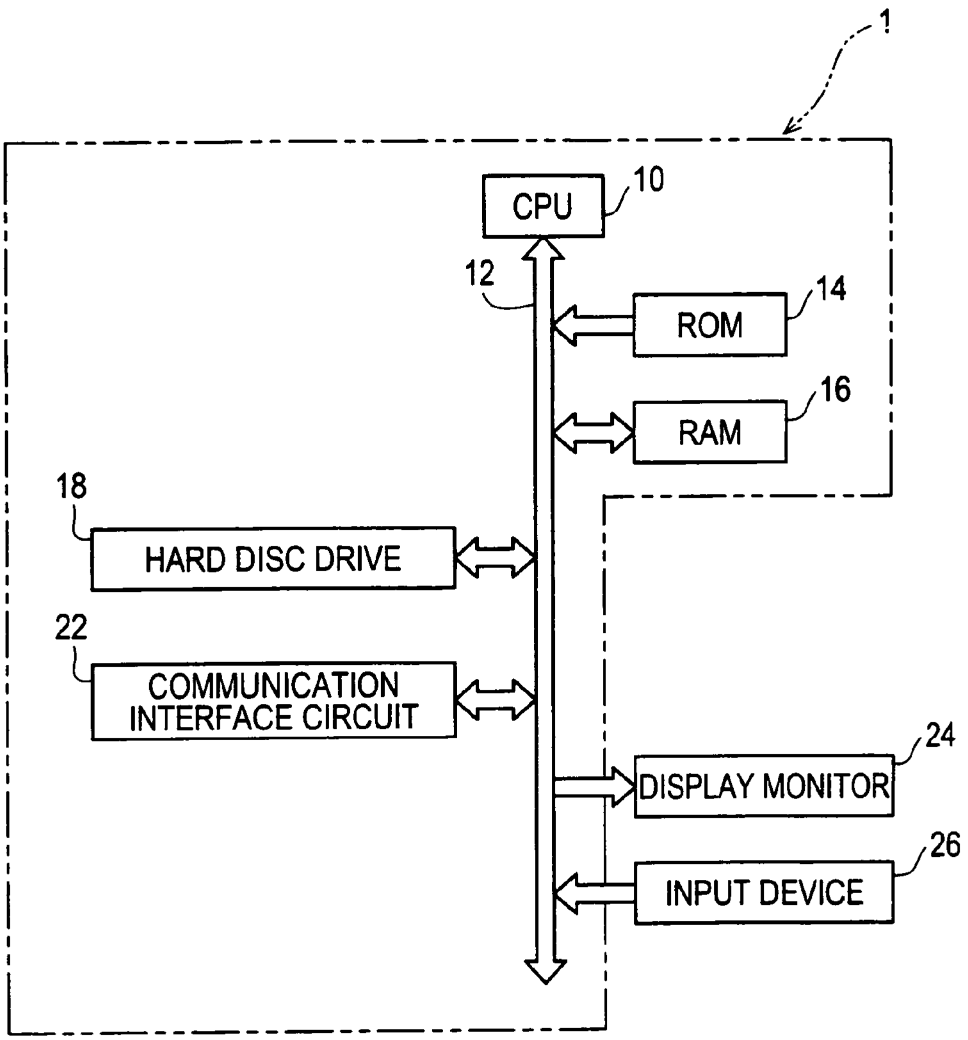
FIG. 2 is a block diagram showing a control circuit of the insurance control server according to the embodiment.
Figure 3:
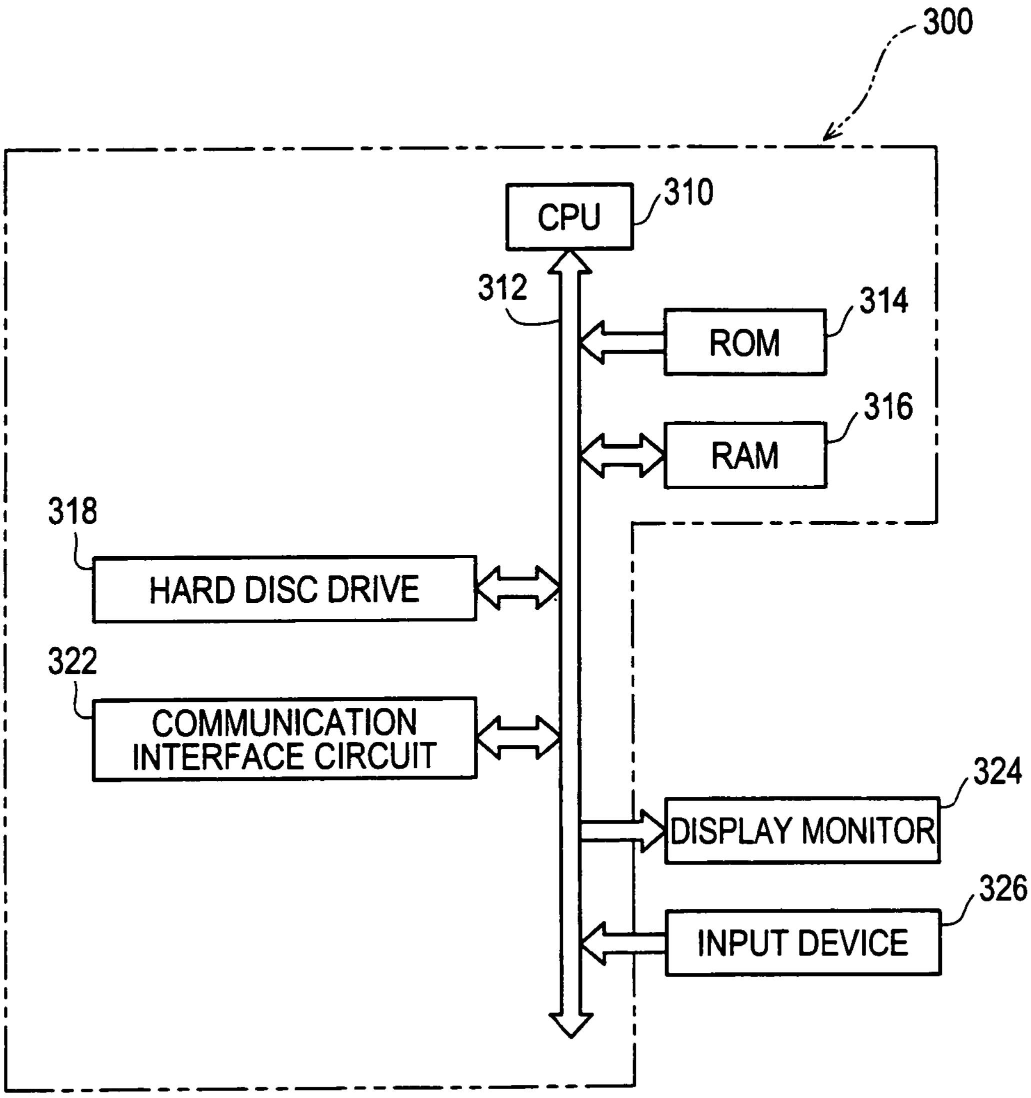
FIG. 3 is a block diagram showing a control circuit of the member control server according to the embodiment.

FIG. 2 is a block diagram showing a construction of the insurance control server 1 mentioned in the above.

The insurance control server 1 has a central processing unit (abbreviated as CPU hereinafter) 10 and the CPU 10 is connected to an input/output bus 12. Thereby, data signals or address signals are input to the CPU 10.

And to the input/output bus 12, a ROM (Read Only Memory) 14 and a RAM (Random Access Memory) 16 are also connected. In the ROM 14, a control program mentioned later to control the insurance control server 1 is stored. Further, in the RAM 16, flags or values of variables utilized in the control program mentioned are stored. And in the RAM 16, there are temporarily stored the ID numbers transmitted from the card units 400 of the gaming machines 2, the member information transmitted from the member control server 300 mentioned later, the game information from the gaming machines 2 mentioned later and the information of the insurance contents stored in a hard disc drive 18 mentioned later.

Further, to the input/output bus 12, the hard disc drive 18 and a communication interface circuit 22 are also connected. In the hard disc drive 18, it is stored a data base in which the information of the insurance contents is accumulated corresponding to the ID numbers of the members who are players. And to the communication interface circuit 22, as shown in FIG. 1, through the network N which is a communication network such as a public telephone network circuit or local area network (LAN), plural gaming machines 2 and the member control server 300 are connected so as to become communicable with each other.

Here, in the embodiment, although the hard disc drive 18 is used as the memory device to store the information of the insurance contents, it is not limited to this. It may be utilized any of memory devices if having large memory capacity and being non-volatile and rewritable such as flash memories.

Further, to the input/output bus 12, a display monitor 24 and an input device 26 are also connected. The display monitor 24 can display thereon, for example, various data such as the information of the insurance contents stored as the data base in the hard disc drive 18. And the input device 26 can transmit commands to display the information of the insurance contents on the display monitor 24 and commands to store the information of new insurance contents in the hard disc drive 18, to the insurance control server 1.

[Construction of the Member Control Server]

The member control server 300 has a CPU 310 and the CPU 310 is connected to an input/output bus 312, thereby the member control server 300 is constructed so that data signals or address signals are input to and output from the CPU 310.

Further, to the input/output bus 312, a ROM 314 and a RAM 316 are connected. In the ROM 314, a control program for controlling the member control server 300 mentioned later is stored. And in the RAM 316, flags or values of variables utilized in the control program mentioned are stored. Further, in the RAM 316, there are temporarily stored the ID numbers transmitted from the insurance control server 1 mentioned later, the member information stored in a hard disc drive 318 mentioned later.

Further, to the input/output bus 312, the hard disc drive 318 and a communication interface circuit 322 are also connected. In the hard disc drive 318, it is stored a data base in which the member information (for example, name, address, birth day, biometrics information, account number of transaction bank and the like) is accumulated corresponding to the ID numbers of the members who are players. And to the communication interface circuit 322, as shown in FIG. 1, through the network N which is a communication network such as a public telephone network circuit or local area network (LAN), plural gaming machines 2 and the insurance control server 1 are connected so as to become communicable with each other. Here, the member control server 300 becomes a base (parent) board of the gaming machines 2 and the ID number of the member control server 300 for communication is set to "0000".

Here, in the embodiment, although the hard disc drive 318 is utilized as the memory device to store the member information, it is not limited to this. It may be utilized any of memory devices if having large memory capacity and being non-volatile and rewritable such as flash memories.

Further, to the input/output bus 312, a display monitor 324 and an input device 326 are also connected. The display monitor 324 can display thereon, for example, various data such as the member information (for example, name, address, birth day, biometrics information, account number of transaction bank and the like) stored as the data base in the hard disc drive 318. And the input device 326 can transmit commands to display the member information on the display monitor 324 and the commands to store new member information in the hard disc drive 318, to the member control server 300.

[Construction of the Gaming Machine]

Figure 4:
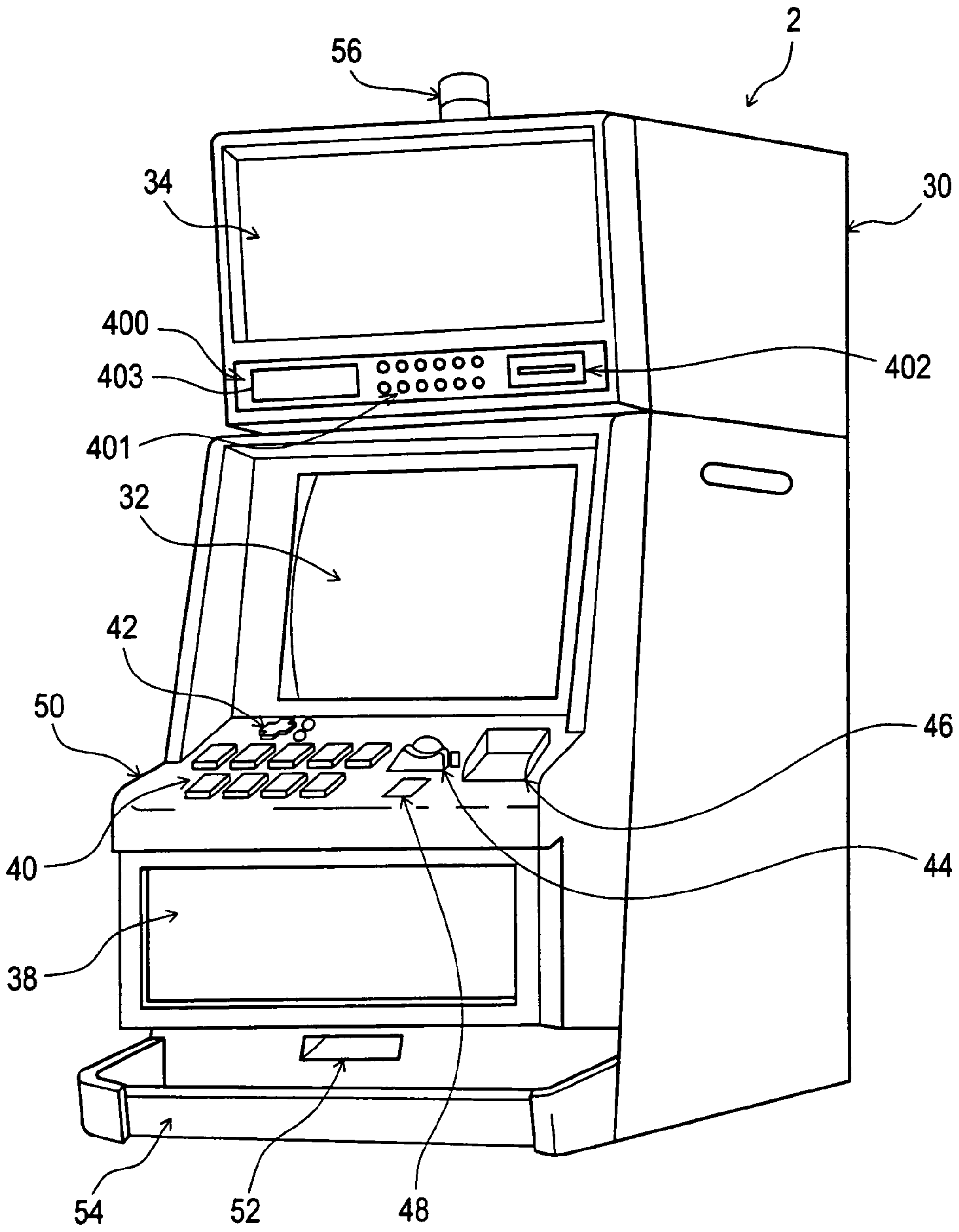
FIG. 4 is a perspective view showing an outline of the gaming machine according to the embodiment.

A perspective view of one example of the gaming machine 2 according to the embodiment is shown in FIG. 4.

The gaming machine 2 is mainly constructed from a cabinet 30. The central front portion of the cabinet 30 is slightly inclined backward against the vertical direction, and on the central front plane thereof, a main display device 32 is provided. On the main display device 32, game information in each of the gaming machines 2 is displayed and the game is progressed on the main display device 32.

And at an upper position of the main display device 32 on the front plane of the cabinet 30, a sub-display device 34 is disposed. On the sub-display device 34, information not capable of being displayed on the main display device 32 or explanation of game rules in the game executed on the main display device 32 is displayed.

Further, a card unit 400 is disposed between the main display device 32 and the sub-display device 34. The card unit 400 has plural buttons 401, a card slot 402 in and from which the member's card is inserted and discharged and a display monitor 403. Each of plural buttons 401 is utilized when input of a personal identification number or instruction to discharge the member's card is conducted. Here, in order to read and write through a reader/writer 404 (see FIG. 5), although an IC card is used as the member's card, it may be used a card (for example, magnetic card) in which at least information whether or not the game insurance is contracted and the ID number are stored, such information and ID number capable of being read.

And on the cabinet 30, an information lamp 56 is provided.

A base portion 50 is substantially horizontally provided at a lower position of the main display device 32. On a left upper plane of the base portion 50, plural switches 40 and a cross switch 42 are arranged. These switches are used when instruction of selection and determination in the game is conducted.

And at a right side on the upper plane of the base portion 50, a coin insertion slot 44 and a bill insertion portion 46 are arranged. When coins or a bill is inserted in the coin insertion slot 44 or the bill insertion portion 46, the game can be executed.

Further, near a coin insertion slot 44, a cashout switch 48 is also arranged, and when such cashout switch 48 is pressed, coins inserted in the gaming machine 2 are paid out from a coin payout opening 52 arranged at a front lower position of the cabinet 30. Coins paid out are accumulated in a coin receiving portion 54.

At an upper position of the coin payout opening 52 on the front lower plane of the cabinet 30, a sub-display device 38 is provided. On the sub-display device 38, various kinds of information can be displayed.

[Construction of Control Device of Gaming Machine]

Figure 5:
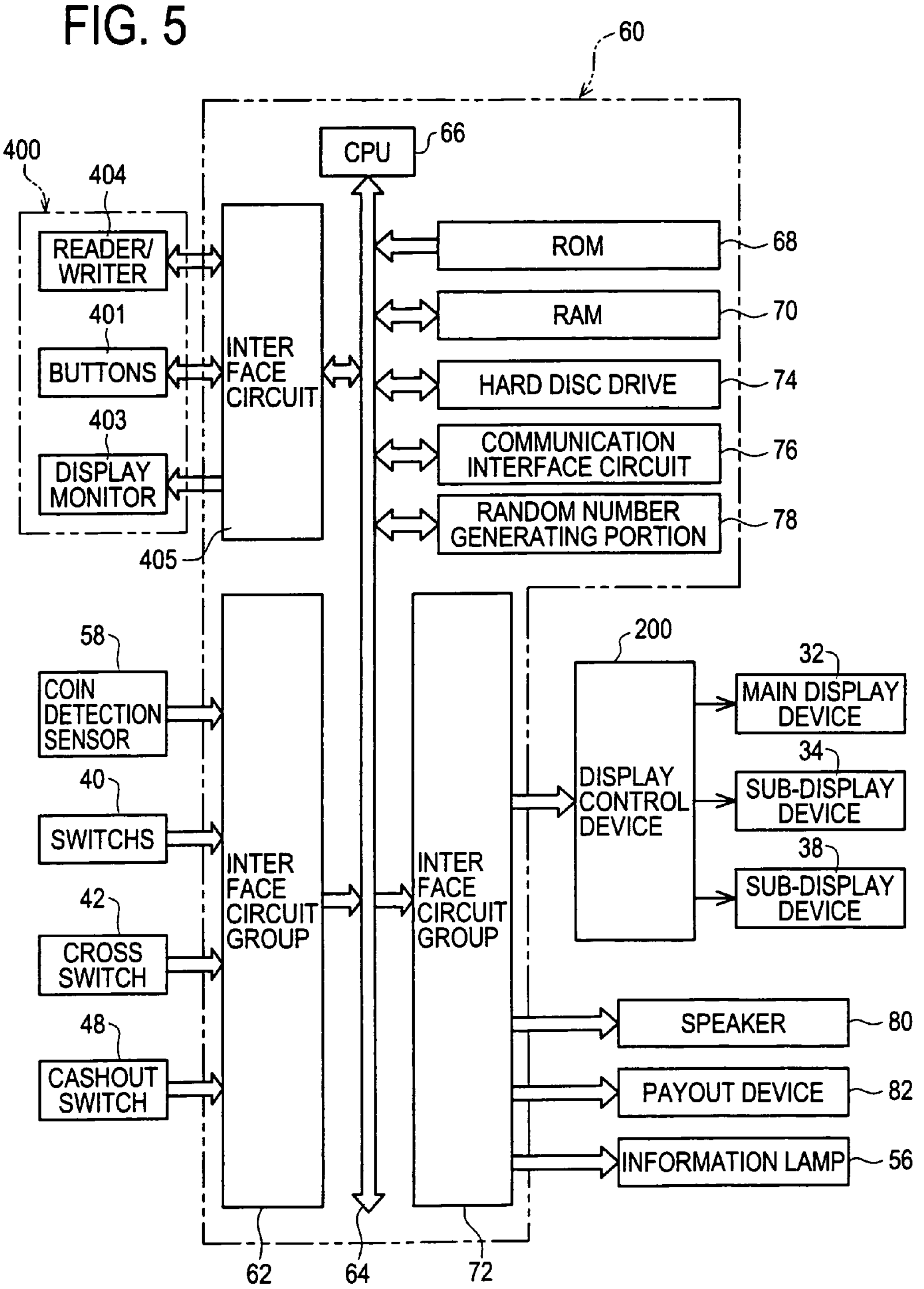
FIG. 5 is a block diagram showing a main control circuit for controlling the gaming machine according to the embodiment.

A block diagram of control portion in the gaming machine described in the above is shown in FIG. 5.

The switches 40 and cross switch 42 are connected to an interface circuit group 62 of a main control circuit 60 and the interface circuit group 62 is connected to an input/output bus 64. When each of the switches is pressed, a predetermined signal is respectively produced and supplied to the input/output bus 64. Through the input/output bus 64, data signals or address signals are input to and output from a CPU 66.

And to the interface circuit group 62 mentioned above, a detection sensor 58 for detecting coins is also connected, and in a case that coins are inserted in the coin insertion slot 44 or a bill is inserted in the bill insertion portion 46, kind of coins or bill inserted and a number thereof are signalized and such signals are supplied to the interface circuit group 62.

And to the interface circuit group 62 mentioned above, the cashout switch 48 is also connected and when the player presses the cashout switch 48, a predetermined signal is supplied to the input/output bus 64, thereby based on such signal, coins inserted in the gaming machine 2 are paid from a coin payout opening 52.

Further, to each of plural gaming machines 2, a discriminative ID number for communication is set, thereby each of the gaming machines 2 is discriminated by the insurance control server 1 or the member control server 300.

To the input/output bus 64 mentioned above, a ROM 68 and a RAM 70 are also connected. The ROM 68 stores a control program for controlling entire stream of the system in the gaming machine. Further, the ROM 68 stores initial data for executing the control program and a part of program for controlling display in the main display device 32. And RAM 70 stores flags or values of variables utilized in the above programs or a game program mentioned later.

And to the input/output buss 64 mentioned above, a hard disc drive 74 is connected.

Here, in the embodiment, although the hard disc drive 74 is used as the memory device to store the game programs and the others, it is not limited to this. It may be utilized any of memory devices if having large memory capacity and being non-volatile and rewritable such as flash memories.

Further, to the input/output bus 64, an interface circuit group 72 is connected. To the interface circuit group 72, a speaker 80, an information lamp 56 and a payout device 82 are connected, thereby the interface circuit group 72 supplies drive signals or drive electric power to drive each of the devices mentioned above, corresponding to a result of calculation process by the CPU 66.

And the information lamp 56 is turned on or blinked when the player calls a shop assistant of the game arcade, based on that abnormality of the gaming machine 2 is detected, thereby abnormality of the gaming machine 2 is informed to the shop assistant of the game arcade.

Furthermore, to the input/output bus 64, a random number generating portion 78 is connected. When a command to produce a random number is output to the random number generating portion 78 from the CPU 66, the random number generating portion 78 generates a random number within a predetermined range and outputs a signal indicated by the random number to the input/output bus 64. The CPU 66 determines a progress state of the game based on the random number generated by the random number generating portion 78. And the random number generated from the random number generating portion 78 is stored as data indicating a lottery result in the RAM 70.

Further, to the input/output bus 64, a communication interface circuit 76 is also connected, and the communication interface circuit 76 conducts communication with the insurance control server 1 and the member control server 300, through the network N which is the communication circuit such as the public telephone network circuit or LAN.

And to the input/output bus 64, an interface circuit 405 is also connected. To the interface circuit 405, the reader/writer 404 arranged within the card unit 400 and the buttons 401, the display monitor 403 are connected, thereby the interface circuit 405 supplies drive signals or drive electric power to drive each of the devices mentioned above, corresponding to a result of calculation process by the CPU 66.

Here, in a case that the member's card, which is the IC card, is inserted in the card slot 402 mentioned above, the reader/writer 404 signalizes the information such as the ID number stored in the member's card and supplied such signal to the interface circuit 405. At that time, if the magnetic card is utilized as the member's card, a magnetic card reading device is arranged instead of the reader/writer 404.

And when each of the buttons 401 is pressed, a predetermined signal is respectively produces and such signal is supplied to the interface circuit 405.

Further, based on that a display command output from the CPU 66 is supplied to the display monitor 403 through the interface circuit 405, images corresponding to above display command are displayed on the display monitor 403.

Furthermore, to the interface circuit group 72, a display control device 200 is also connected and the display control device 200 produces drive signals to drive the main display device 32 and the sub-display devices 34 and 38, all of which are connected to the display control device 200, based on the image display command output from the main control circuit 60.

[Construction of Display Control Device of Gaming Machine]

Figure 6:
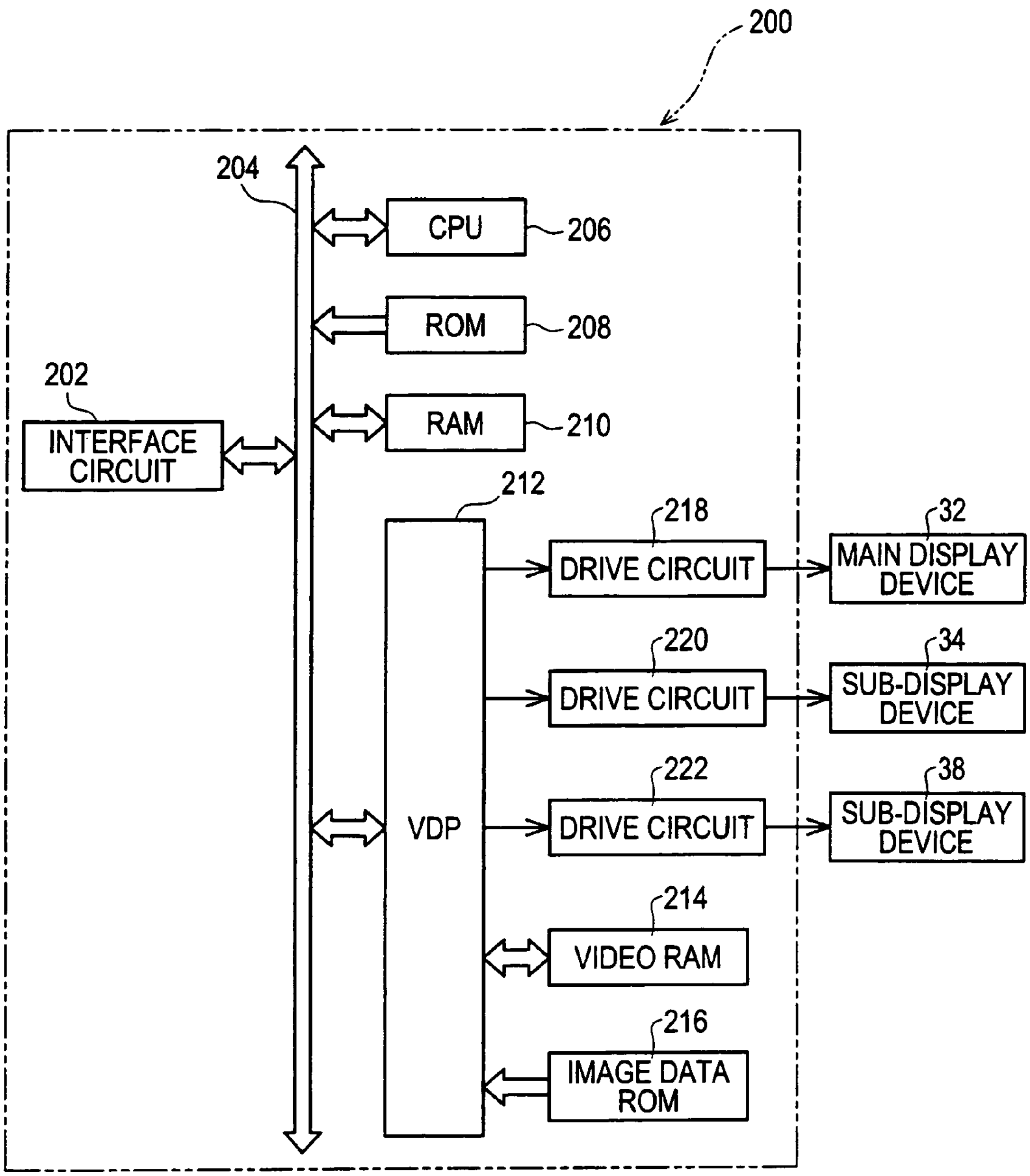
FIG. 6 is a block diagram showing a display control device of the gaming machine according to the embodiment, FIGS. 7A and 7B indicate a flowchart of a control process example executed in the gaming control system according to the embodiment, and FIGS. 8A and 8B indicate a flowchart of a control process example executed in the gaming control system according to the embodiment.

A block diagram showing a circuit of the display control device 200 is shown in FIG. 6.

In FIG. 6, an interface circuit 202 is connected to an input/output bus 204 and the image display command supplied from the main control circuit 60 is supplied to the input/output bus 204 through the interface circuit 202. Through the input/output bus 204, data signals or address signals are input to and output from the CPU 206.

To the input/output bus 204, a ROM 208 and a RAM 210 are also connected. The ROM 208 stores a display control program for producing drive signals supplied to the main display device 32 based on the image display command output from the main control circuit 60. And the RAM 210 stores flags or values of variables utilized in the above program.

Further, to the input/output bus 204, an image data processor (hereinafter, abbreviated as "VDP") 212 is also connected. This VDP 212 includes circuits such as so-called splite circuit, screen circuit and palette circuit. The VDP 212 is a process device capable of conducting various processes to display images on the main display device 32.

To the VDP 212 mentioned above, a video RAM 214 for storing image data corresponding to the image display command output from the main control circuit 60 and an image data ROM 216 for storing image data such as image data of figures, image data of characters, are connected. Further, to the VDP 212, a drive circuit 218 for producing a drive signal to drive the main display device 32, a drive circuit 220 for producing a drive signal to drive the sub-display device 34 and a drive circuit 222 for producing a drive signal to drive the sub-display device 38, are also connected.

The CPU 206 mentioned above reads out the display control program stored in the ROM 208 and executes such program, thereby the image data displayed on the main display device 32 corresponding to the image display command output from the main control circuit 60 are stored in the video RAM 214. As for the image display command output from the main control circuit 60, display commands such as a background display command, a symbol display command and a character display command are included.

And the image data ROM 216, as mentioned in the above, stores image data such as image data of symbols which are discriminative information images, character image data of characters such as animals displayed as effect images and background image data constructing background of the main display device 32.

The image data mentioned above are utilized when the symbols are variably displayed or stopped and displayed on the main display device 32, and such image data include variegated display modes, for example, image data corresponding to enlarged images, reduced images and modified images. And the character data mentioned above include image data necessary to display a mode in which a series of motions are conducted by characters.

Figure 7A:
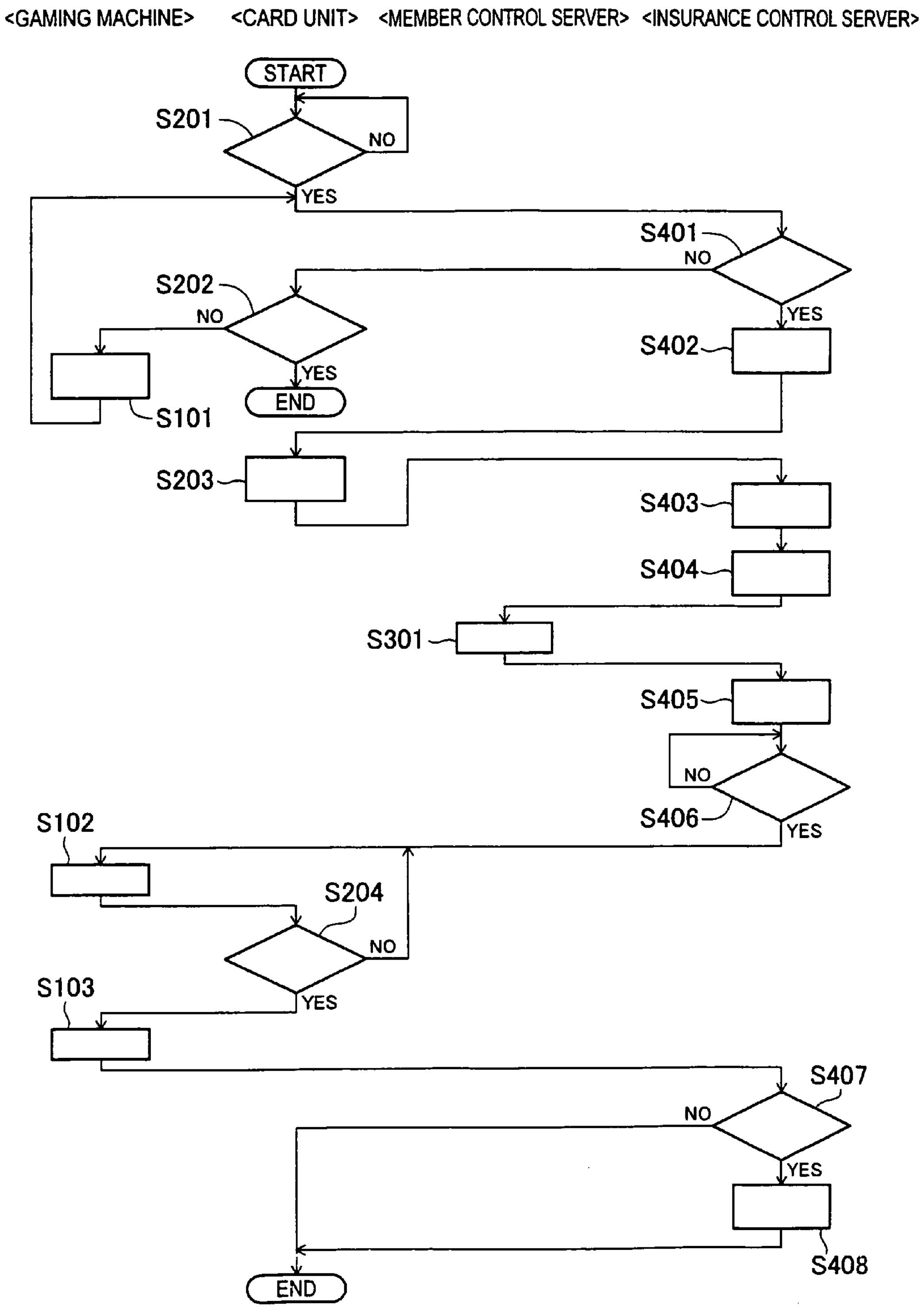

Next, control contents in the gaming control system 500 of the embodiment will be described with reference to FIGS. 7A and 7B. FIGS. 7A and 7B indicate a flowchart showing a control process example executed in the gaming control system 500 of the embodiment.

As shown in FIGS. 7A and 7B, in the gaming control system 500 of the embodiment, at first, procedure waits till the member's card is inserted in the card insertion slot 402 in S201 executed in the card unit 400. And if the CPU 66 of the gaming machine 2 with the card unit 400 determines that the member's card is inserted in the card insertion slot 402 through the reader/writer 404 (S201: YES), the information whether or not the game insurance is contracted, the information being read out through the reader/writer 404, is transmitted to the insurance control server 1, thereafter procedure shifts to S401 executed in the insurance control server 1.

And in S401 executed in the insurance control server 1, based on the information whether or not the game insurance is contracted, the information being transmitted from the gaming machine 2 with the card unit 400, it is determined whether or not the game insurance is contracted.

At that time, if the CPU 10 of the insurance control server 1 including, for example, a second determination device, determines that the game insurance is not contracted (S401: NO), procedure shifts to S202 executed in the card unit 400 and it is determined whether or not the member's card is discharged. Here, the CPU 66 of the gaming machine 2 with the card unit 400 controls the display monitor 403 of the card unit 400 so as to display a message, for example, "May your member's card be discharged?", thereby it is urged determination of the player whether or not the member's card is to be discharged. And based on that the player presses the button 401 of the card unit 400, determination of the player whether or not the member's card is to be discharged is confirmed.

At that time, if the CPU 66 of the gaming machine 2 with the card unit 400 determines that the member's card is not discharged (S202: NO), procedure shifts to S101 executed in the gaming machine 2 and the CPU 66 of the gaming machine 2 with the card unit 400 progresses the game which is out of the game insurance. Thereafter, procedure returns to S401 executed in the insurance control server 1 and the above processes are repeated.

On the other hand, if the CPU 66 of the gaming machine 2 with the card unit 400 determines that the member's card is to be discharged (S202: YES), the member's card is discharged from the card insertion slot 402 through the reader/writer 404, thereafter this control process is terminated.

And in S401 executed in the insurance control server 1, if the CPU 10 of the insurance control server 1 determines that the game insurance is contracted (S401: YES), procedure shifts to S402 and the command signal for requiring that the ID number stored in the member's card is transmitted is transmitted to the gaming machine 2 with the card unit 400. Thereafter, procedure shifts to S203 executed in the card unit 400.

And in S203 executed in the card unit 400, the CPU 66 of the gaming machine 2 with the card unit 400 transmits the ID number read out from the member's card to the insurance control server 1 through the reader/writer 404. Thereafter, procedure shifts to S403 executed in the insurance control server 1.

And in S403 executed in the insurance control server 1, when the insurance control server 1 receives the ID number from the gaming machine 2 with the card unit 400, procedure shifts to S404 and the CPU 10 of the insurance control server 1 transmits the command signal for requiring that the member information corresponding to the ID number is transmitted, to the member control server 300. Thereafter, procedure shifts to S301 executed in the member control server 300.

And in S301 executed in the member control server 300, the CPU 310 of the member control server 300 transmits the member information corresponding to the ID number read out from the hard disc drive 318 on the basis of the ID number to the insurance control server 1. Thereafter, procedure shifts to S405 executed in the insurance control server 1.

And in S405 executed in the insurance control server 1, when the insurance control server 1 receives the member information from the member control server 300, procedure shifts to 5406 and the CPU 10 of the insurance control server 1 including, for example, a confirmation device, determines that the premium of the game insurance is paid out for the player who is the member specified through the ID number, based on the information of the insurance contents read out from the hard disc drive 18 through the ID number.

At that time, if the CPU 10 of the insurance control server 1 determines that the premium of the game insurance is not paid out for the player who is the member specified through the ID number (S406: NO), procedure returns to S406. In S406, for example, the premium is pulled down from the account based on the account number which is obtained from the member information of the player who is the member specified through the ID number, or the premium is directly paid out by the player who is the member specified through the ID number. And procedure waits till it is confirmed that the premium of the game insurance is paid out for the player who is the member specified through the ID number.

On the other hand, if the CPU 10 of the insurance control server 1 determines that the premium of the game insurance is already paid out for the player who is the member specified through the ID number (S406: YES), procedure shifts to S102 executed in the gaming machine 2.

And in S102 executed in the gaming machine 2, the CPU 66 of the gaming machine 2 with the card unit 400 progresses the game which is the object of the game insurance. Thereafter, procedure shifts to S204 executed in the card unit 400 and it is determined whether or not the member's card is discharged. Here, the CPU 66 of the gaming machine 2 with the card unit 400 controls the display monitor 403 of the card unit 400 so as to display a message, for example, "May your member's card be discharged?", thereby it is urged determination of the player whether or not the member's card is to be discharged. And based on that the player presses the button 401 (e.g., a selection device) of the card unit 400, determination of the player whether or not the member's card is to be discharged is confirmed.

At that time, if the CPU 66 of the gaming machine 2 with the card unit 400 determines that the member's card is not discharged (S204: NO), procedure returns to S102 executed in the gaming machine 2 and the above processes are repeated.

On the other hand, if the CPU 66 of the gaming machine 2 with the card unit 400 determines that the member's card is to be discharged (S204: YES), the member's card is discharged from the card insertion slot 402 through the reader/writer 404, thereafter procedure shifts to S103 executed in the gaming machine 2.

And in S103 executed in the gaming machine 2, the CPU 66 of the gaming machine 2 with the card unit 400 transmits the game information concerning with a result of the game which is the object of the game insurance to the insurance control server 1. Thereafter, procedure shifts to S407 executed in the insurance control server 1.

And in S407 executed in the insurance control server 1, the CPU 10 of the insurance control server 1 determines whether or not the insurance payout condition is satisfied for the player who is the member specified through the ID number, based on the game information output from the gaming machine 2 with the card unit 400 and the information of the insurance contents read out from the hard disc drive 18 through the ID number. That is, the CPU 10 of the insurance control server 1 determines whether or not the insurance money is paid.

At that time, if the CPU 10 of the insurance control server 1 determines that the insurance money is paid (S407: YES), procedure shifts to S408 and the payout list of the insurance money is renewed according to the payout of the insurance money. That is, the insurance contents of the hard disc drive 18 is rewritten through the ID number, thereafter this control process is terminated. On the other hand, if the CPU 10 of the insurance control server 1 determines that the insurance money is not paid (S407: NO), this control process is directly terminated.

Here, as for the worthy things paid as the insurance money, there may exist the game media and the like such as coins, medals, tokens, tickets, points, cards (in case of cards, point data or money data corresponding to the insurance money are written in the card), and the insurance money may be actually paid in the account of the player.

As mentioned, in a case that the control process shown in FIGS. 7A and 7B is executed in the gaming control system 500 of the embodiment, when the member's card is discharged from the card insertion slot 402 through the card unit 400 (S204: YES), that is to say, when the game in the gaming machine 2 with the card unit 400 is terminated, it is determined whether or not the insurance money is paid by the CPU 10 of the insurance control server 1 (S407).

Here, the timing that it is determined by the CPU 10 of the insurance control server 1 whether or not the insurance money is paid may be set to a timing every each game progressed in the gaming machine 2 is terminated (for example, every rotation of the reels of the slot game is stopped), different from the control process shown in FIGS. 7A and 7B in which such timing is set when the game in the gaming machine 2 is terminated.

Figure 8A:
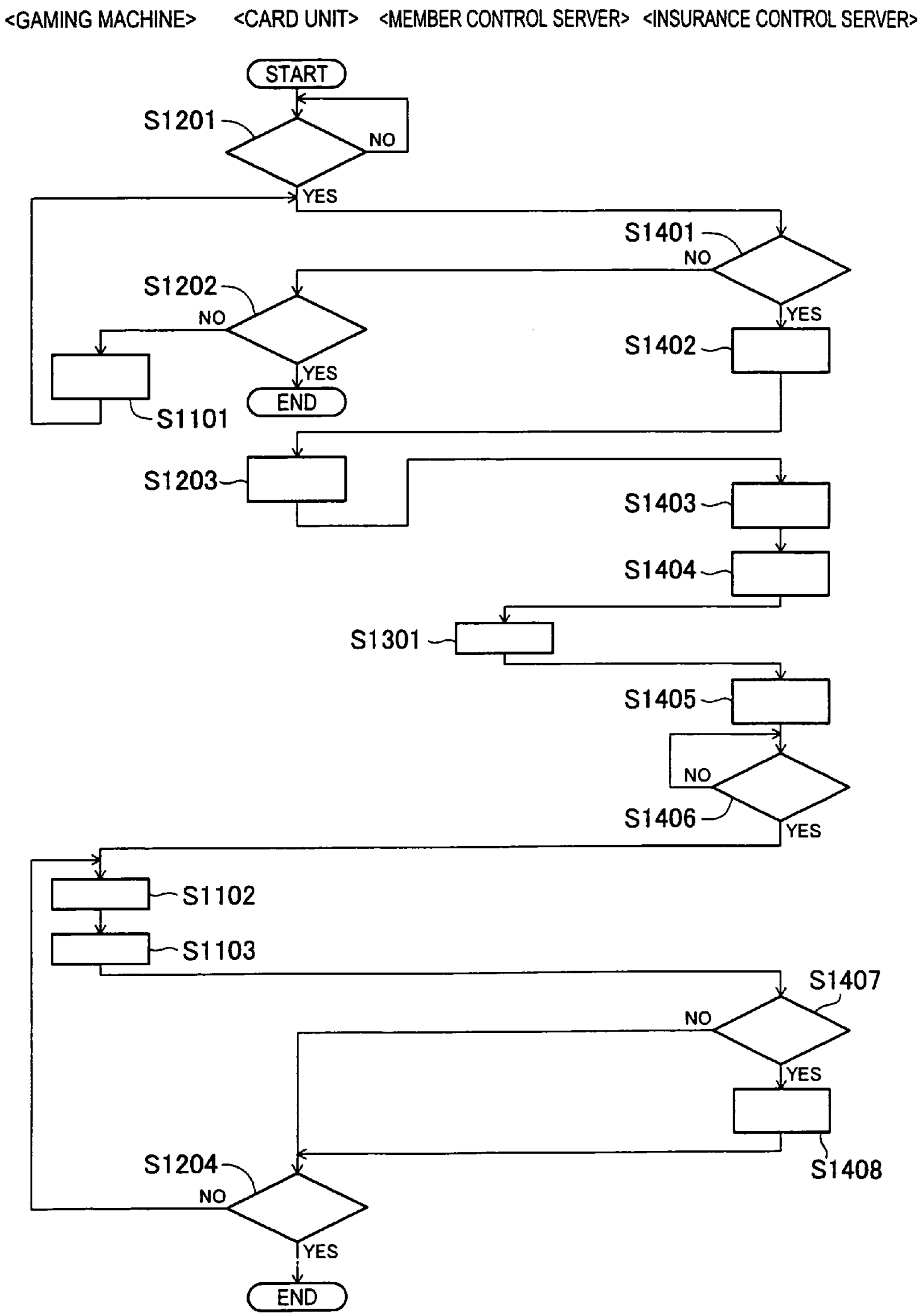

Thus, in the gaming control system 500 of the embodiment, it will be described with reference to FIGS. 8A and 8B the control process in which the timing that it is determined by the CPU 10 of the insurance control server 1 whether or not the insurance money is paid is set every each game progressed in the gaming machine 2 is terminated. FIGS. 8A and 8B indicate another flowchart of the control process example capable of being executed in the gaming control system of the embodiment.

As shown in FIGS. 8A and 8B, in the gaming control system 500 of the embodiment, at first, procedure waits till the member's card is inserted in the card insertion slot 402 in S1201 executed in the card unit 400. And if the CPU 66 of the gaming machine 2 with the card unit 400 determines that the member's card is inserted in the card slot 302 through the reader/writer 404 (S1201: YES), the information whether or not the game insurance is contracted, the information being read out through the reader/writer 404, is transmitted to the insurance control server 1, thereafter procedure shifts to S1401 executed in the insurance control server 1.

And in S1401 executed in the insurance control server 1, based on the information whether or not the game insurance is contracted, the information being transmitted from the gaming machine 2 with the card unit 400, it is determined whether or not the game insurance is contracted.

At that time, if the CPU 10 of the insurance control server 1 determines that the game insurance is not contracted (S1401: NO), procedure shifts to S1202 executed in the card unit 400 and it is determined whether or not the member's card is discharged. Here, the CPU 66 of the gaming machine 2 with the card unit 400 controls the display monitor 403 of the card unit 400 so as to display a message, for example, "May your member's card be discharged?", thereby it is urged determination of the player whether or not the member's card is to be discharged. And based on that the player presses the button 401 of the card unit 400, determination of the player whether or not the member's card is to be discharged is confirmed.

At that time, if the CPU 66 of the gaming machine 2 with the card unit 400 determines that the member's card is not discharged (S1202: NO), procedure shifts to S1101 executed in the gaming machine 2 and the CPU 66 of the gaming machine 2 with the card unit 400 progresses the game which is out of the game insurance. Thereafter, procedure returns to S1401 executed in the insurance control server 1 and the above processes are repeated.

On the other hand, if the CPU 66 of the gaming machine 2 with the card unit 400 determines that the member's card is to be discharged (S1202: YES), the member's card is discharged from the card insertion slot 402 through the reader/writer 404, thereafter this control process is terminated.

And in S1401 executed in the insurance control server 1, if the CPU 10 of the insurance control server 1 determines that the game insurance is contracted (S1401: YES), procedure shifts to S1402 and the command signal for requiring that the ID number stored in the member's card is transmitted is transmitted to the gaming machine 2 with the card unit 400. Thereafter, procedure shifts to S1203 executed in the card unit 400.

And in S1203 against the card unit 400, the CPU 66 of the gaming machine 2 with the card unit 400 transmits the ID number read out from the member's card to the insurance control server 1 through the reader/writer 404. Thereafter, procedure shifts to S1403 executed in the insurance control server 1.

And in S1403 executed in the insurance control server 1, when the insurance control server 1 receives the ID number from the gaming machine 2 with the card unit 400, procedure shifts to S1404 and the CPU 10 of the insurance control server 1 transmits the command signal for requiring that the member information corresponding to the ID number is transmitted, to the member control server 300. Thereafter, procedure shifts to S1301 executed in the member control server 300.

And in S1301 executed in the member control server 300, the CPU 310 of the member control server 300 transmits the member information corresponding to the ID number read out from the hard disc drive 318 on the basis of the ID number to the insurance control server 1. Thereafter, procedure shifts to S1405 executed in the insurance control server 1.

And in S1405 against the insurance control server 1, when the insurance control server 1 receives the member information from the member control server 300, procedure shifts to S1406 and the CPU 10 of the insurance control server 1 determines that the premium of the game insurance is paid out for the player who is the member specified through the ID number, based on the information of the insurance contents read out from the hard disc drive 18 through the ID number.

At that time, if the CPU 10 of the insurance control server 1 determines that the premium of the game insurance is not paid out for the player who is the member specified through the ID number (S1406: NO), procedure returns to S1406. In S1406, for example, the premium is pulled down from the account based on the account number which is obtained from the member information of the player who is the member specified through the ID number, or the premium is directly paid out by the player who is the member specified through the ID number. And procedure waits till it is confirmed that the premium of the game insurance is paid out for the player who is the member specified through the ID number.

On the other hand, if the CPU 10 of the insurance control server 1 determines that the premium of the game insurance is already paid out for the player who is the member specified through the ID number (S1406: YES), procedure shifts to S1102 executed in the gaming machine 2.

And in S1102 executed in the gaming machine 2, the CPU 66 of the gaming machine 2 with the card unit 400 progresses the game which is the object of the game insurance. Thereafter, procedure shifts to S1103 and the CPU 66 of the gaming machine 2 with the card unit 400 transmits the information concerning with a result of the game (here, result of one game) which is the object of the game insurance to the insurance control server 1. Thereafter, procedure shifts to S1407 executed in the insurance control server 1.

And in S1407 executed in the insurance control server 1, the CPU 10 of the insurance control server 1 determines whether or not the insurance payout condition is satisfied for the player who is the member specified through the ID number, based on the game information output from the gaming machine 2 with the card unit 400 and the information of the insurance contents read out from the hard disc drive 18 through the ID number. That is, the CPU 10 of the insurance control server 1 determines whether or not the insurance money is paid.

At that time, if the CPU 10 of the insurance control server 1 determines that the insurance money is paid (S1407: YES), procedure shifts to S1408 and the payout list of the insurance money is renewed according to the payout of the insurance money. That is, the insurance contents of the hard disc drive 18 is rewritten through the ID number, thereafter procedure shifts to S1204 executed in the card unit 400. On the other hand, if the CPU 10 of the insurance control server 1 determines that the insurance money is not paid (S1407: NO), procedure directly shifts to S1204 executed in the card unit 400.

And in S1204 executed in the card unit 400, it is determined whether or not the member's card is discharged. Here, the CPU 66 of the gaming machine 2 with the card unit 400 controls the display monitor 403 of the card unit 400 so as to display a message, for example, "May your member's card be discharged?", thereby it is urged determination of the player whether or not the member's card is to be discharged. And based on that the player presses the button 401 of the card unit 400, determination of the player whether or not the member's card is to be discharged is confirmed.

At that time, if the CPU 66 of the gaming machine 2 with the card unit 400 determines that the member's card is not discharged (S1204: NO), procedure returns to S1102 executed in the gaming machine 2 and the above processes are repeated.

On the other hand, if the CPU 66 of the gaming machine 2 with the card unit 400 determines that the member's card is to be discharged (S1204: YES), the member's card is discharged from the card insertion slot 402 through the reader/writer 404, thereafter the control process is terminated.

As mentioned in the above, in the gaming control system 500 of the embodiment, concerning with the game insurance objectifying the game result in each of the gaming machines 2, the CPU 10 of the insurance control server 1 determines whether or not the insurance money of the game insurance is paid in S407 in FIGS. 7A and 7B or in S1407 in FIGS. 8A and 8B based on the game information transmitted from each of the gaming machines 2 in S103 in FIGS. 7A and 7B or in S1103 in FIGS. 8A and 8B and the information of the insurance contents stored in the hard disc drive 18 of the insurance control server 1. Therefore, based on that the information of the insurance contents stored in the hard disc drive 18 of the insurance control server 1 is utilized, variegated services can be developed corresponding to request of the player, even if the insurance contents contracted by each player are different with each other.

Further, in the gaming control system 500 of the embodiment, the CPU 10 of the insurance control server 1 specifies the player of the member who is the object person of the game insurance in S407 in FIGS. 7A and 7B or S1407 in FIGS. 8A and 8B based on the ID number of the member's card transmitted from the card unit 400 of the gaming machine 2 in S203 in FIGS. 7A and 7B or in S1203 in FIGS. 8A and 8B and the member information transmitted from the hard disc drive 318 of the member control server 300 in S301 in FIGS. 7A and 7B or in S1301 in FIGS. 8A and 8B. Therefore, based on the member information stored in the hard disc drive 318 of the member control server 300 is utilized, variegated services can be developed corresponding to request of the player, even if the insurance contents contracted by each player are different with each other.

Here, the present invention is not limited to the above embodiment and various modifications and changes can be done within the scope of the present invention.

For example, in the gaming control system 500 of the embodiment, there may be following cases to realize the contract of the game insurance. Concretely, there may be a case as follows. That is, the player who is the member produces a state capable of recognizing the ID number of the member's card in the card unit 400 and the main display device 32 or the sub-display devices 34, 38 of the gaming machine 2 display an insurance subscribing image, and if the player operates to subscribe to the insurance through the gaming machine 2, the member information corresponding to the ID number of the member's card is transmitted to the insurance control server 1, thereby the insurance control server 1 pulls down the premium from the account the account number of which is obtained from the member information and stores the information of the insurance contents in the hard disc drive 18, thereby the contract of the game insurance is realized. Further, there may be a case that the contract of the game insurance is realized with a document based on that the player pays the premium with a cash and such information of the insurance contents is stored in the hard disc drive 18 through the input device 26.

The present invention can be adopted for a gaming control system in which a series of processes from production of the insurance contract to payout of the insurance money are conducted by utilizing the member's card.

What is claimed is:

1. A gaming control system, comprising:

a gaming machine, a member control server, and an insurance control server connected through a network, wherein the gaming machine includes a first processor configured to conduct at least one of a first game or a second game according to a game control program stored in a first memory; and a card unit arranged in the gaming machine and configured to read an ID number of a member's card, the member control server includes a second processor configured to control member information according to a member information control program stored in a second memory; and a member memory device configured to store the member information corresponding to the ID number read by the card unit of the gaming machine, and the insurance control server includes a third processor configured to control insurance information according to an insurance control program stored in a third memory; and an insurance memory device configured to store the insurance information corresponding to an object person of a game insurance;

the first processor is configured to determine whether or not the member's card is detected through the card unit, the third processor determines whether or not the game insurance is contracted when the member's card is detected by the first processor and, when determining that the game insurance is contracted, the third processor specifies the object person of the game insurance based on the member information stored in the member memory device transmitted by the second processor of the member control server and the ID number read by the card unit of the gaming machine and confirms whether or not a premium is paid by the object person specified thereby, the first processor conducts the first game which is an object of the game insurance in the gaming machine when the third processor determines that the premium is paid by the object person, determines whether or not the member's card is discharged from the card unit after the first game is terminated, and, when determining that the member's card is discharged from the card unit, transmits game information to the insurance control server, and the third processor determines whether or not an insurance payout condition is satisfied based on the game information transmitted by the first processor when the member's card is determined to be discharged from the card unit and, when determining that the insurance payout condition is satisfied, pays out insurance of the game insurance for the object person of the game insurance specified thereby based on the game information transmitted by the first processor of the gaming machine and the insurance information stored in the insurance memory device, after paying out the insurance of the game insurance for the object person of the game insurance based on the first processor determining that the member's card is discharged from the card unit and transmitting the game information to the insurance control server, the third processor updates the insurance information of the object person stored in the insurance memory device, and when the third processor determines that the insurance is not contracted and when determining that the member's card is not discharged from the card unit, the first processor conducts the second game which is not covered by the game insurance under a state that the member's card is inserted in the card unit.

2. The gaming control system according to claim 1, wherein the card unit further comprises a display monitor and a discharge button, and when determined by the third processor that the game insurance is not contracted, the first processor displays a message on the display monitor inquiring of a player whether or not the member's card is to be discharged and determines whether or not the member's card is discharged based on whether the player presses the discharge button according to the message.

3. The gaming control system according to claim 2, wherein the gaming machine continues to conduct first games so long as the first processor determines that the member's card is not discharged based on whether the player presses the discharge button according to the message.

4. A gaming control system, comprising:

a gaming machine, a member control server, and an insurance control server connected through a network, wherein the gaming machine includes a first processor configured to conduct at least one of a first game or a second game according to a game control program stored in a first memory; and a card unit arranged in the gaming machine and configured to read an ID number of a member's card, the member control server includes a second processor configured to control member information according to a member information control program stored in a second memory; and a member memory device configured to store the member information corresponding to the ID number read by the card unit of the gaming machine, and the insurance control server includes a third processor configured to control insurance information according to an insurance control program stored in a third memory; and an insurance memory device configured to store the insurance information corresponding to an object person of a game insurance;

the first processor is configured to determine whether or not the member's card is detected through the card unit, the third processor determines whether or not the game insurance is contracted when the member's card is detected by the first processor and, when determining that the game insurance is contracted, the third processor specifies the object person of the game insurance based on the member information stored in the member memory device transmitted by the second processor of the member control server and the ID number read by the card unit of the gaming machine and confirms whether or not a premium is paid by the object person specified thereby, the first processor conducts the first game which is an object of the game insurance in the gaming machine when the third processor determines that the premium is paid by the object person, determines whether or not the member's card is discharged from the card unit after the first game is terminated, and, when determining that the member's card is discharged from the card unit, transmits game information to the insurance control server, and the third processor determines whether or not an insurance payout condition is satisfied based on the game information transmitted by the first processor when the member's card is determined to be discharged from the card unit and, when determining that the insurance payout condition is satisfied, pays out insurance of the game insurance for the object person of the game insurance specified thereby based on the game information transmitted by the first processor of the gaming machine and the insurance information stored in the insurance memory device, after paying out the insurance of the game insurance for the object person of the game insurance based on the first game being terminated and the first processor transmitting the game information to the insurance control server, the third processor updates the insurance information of the object person stored in the insurance memory device each time the first processor determines that the member's card is not discharged from the card unit and the first game is terminated, and when the third processor determines that the insurance is not contracted and when determining that the member's card is not discharged from the card unit, the first processor conducts the second game which is not covered by the game insurance under a state that the member's card is inserted in the card unit.

5. The gaming control system according to claim 4, wherein the third processor determines whether or not the insurance of the game insurance is paid for the object person of the game insurance each time the first gamer is terminated.

6. The gaming control system according to claim 4, wherein the first processor of the gaming machine continues conducting first games so long as the first processor determines that the member's card is not discharged from the card unit.

* * * * *